(12) United States Patent
Tanaka et al.

(10) Patent No.: US 11,292,469 B2
(45) Date of Patent: Apr. 5, 2022

(54) DUMP TRUCK AND REVERSING ASSISTANCE DEVICE

(71) Applicant: HITACHI CONSTRUCTION MACHINERY CO., LTD., Tokyo (JP)

(72) Inventors: Wataru Tanaka, Tokyo (JP); Hidefumi Ishimoto, Tsuchiura (JP); Hideto Ishibashi, Tsuchiura (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 332 days.

(21) Appl. No.: 16/477,565

(22) PCT Filed: Feb. 27, 2018

(86) PCT No.: PCT/JP2018/007267
§ 371 (c)(1),
(2) Date: Jul. 12, 2019

(87) PCT Pub. No.: WO2018/155709
PCT Pub. Date: Aug. 30, 2018

(65) Prior Publication Data
US 2019/0367030 A1  Dec. 5, 2019

(30) Foreign Application Priority Data
Feb. 27, 2017  (JP) .............................. JP2017-035136

(51) Int. Cl.
*B60W 30/18* (2012.01)
*E02F 9/20* (2006.01)
(Continued)

(52) U.S. Cl.
CPC ....... *B60W 30/18036* (2013.01); *E02F 3/435* (2013.01); *E02F 9/205* (2013.01);
(Continued)

(58) Field of Classification Search
CPC ................ B60W 30/18036; B60P 1/04; B60R 2021/0011; B60R 2300/8093;
(Continued)

(56) References Cited

U.S. PATENT DOCUMENTS 9,823,082 B2 * 11/2017 Lewis .............. G08G 1/096741
10,240,323 B2 * 3/2019 Kurihara ............... G01S 13/931

FOREIGN PATENT DOCUMENTS

| JP | 2008-097632 A | 4/2008 |
| JP | 2015-081877 A | 4/2015 |

(Continued)

OTHER PUBLICATIONS

International Search Report of PCT/JP2018/007267 dated Apr. 24, 2018.

*Primary Examiner* — Geepy Pe
*Assistant Examiner* — Sean Patrick Reidy
(74) *Attorney, Agent, or Firm* — Mattingly & Malur, PC

(57) ABSTRACT

A reversing assistance device suited for a mining dump truck measures a first distance to a first object, which exists at a first height comprising a trajectory of a rear wheel of the dump truck during reversing, and a second distance to a second object, which exists at a second height comprising a trajectory of a vessel during the reversing, for computing the position of the first object. If the distance between the position of the first object and a designated loading position designated by an operator of a loading machine is equal to or smaller than a threshold, the first object is determined to be an approachable object, a smaller one of the first distance and the second distance is determined as a target stop distance, and based on the target stop distance, a target stop position is computed.

4 Claims, 17 Drawing Sheets

(51) Int. Cl.
  *G05D 1/02* (2020.01)
  *G08G 1/09* (2006.01)
  *G08G 1/16* (2006.01)
  *E02F 3/43* (2006.01)
  *G08G 1/00* (2006.01)
  *B60P 1/04* (2006.01)
  *B60R 21/00* (2006.01)
(52) U.S. Cl.
  CPC ........... *E02F 9/2045* (2013.01); *G05D 1/021* (2013.01); *G08G 1/09* (2013.01); *G08G 1/16* (2013.01); *G08G 1/165* (2013.01); *G08G 1/168* (2013.01); *G08G 1/202* (2013.01); *B60P 1/04* (2013.01); *B60R 2021/0011* (2013.01); *B60R 2300/8093* (2013.01); *G05D 2201/0202* (2013.01)
(58) Field of Classification Search
  CPC ......... E02F 9/2045; E02F 9/205; E02F 3/435; G05D 2201/0202; G05D 1/0212; G05D 1/021; G08G 1/165; G08G 1/168; G08G 1/202; G08G 1/09; G08G 1/16
  USPC .......................................................... 701/50
  See application file for complete search history.

(56) References Cited

FOREIGN PATENT DOCUMENTS

| | | |
|---|---|---|
| JP | 2016-071563 A | 5/2016 |
| WO | 2016/167375 A1 | 10/2016 |

\* cited by examiner

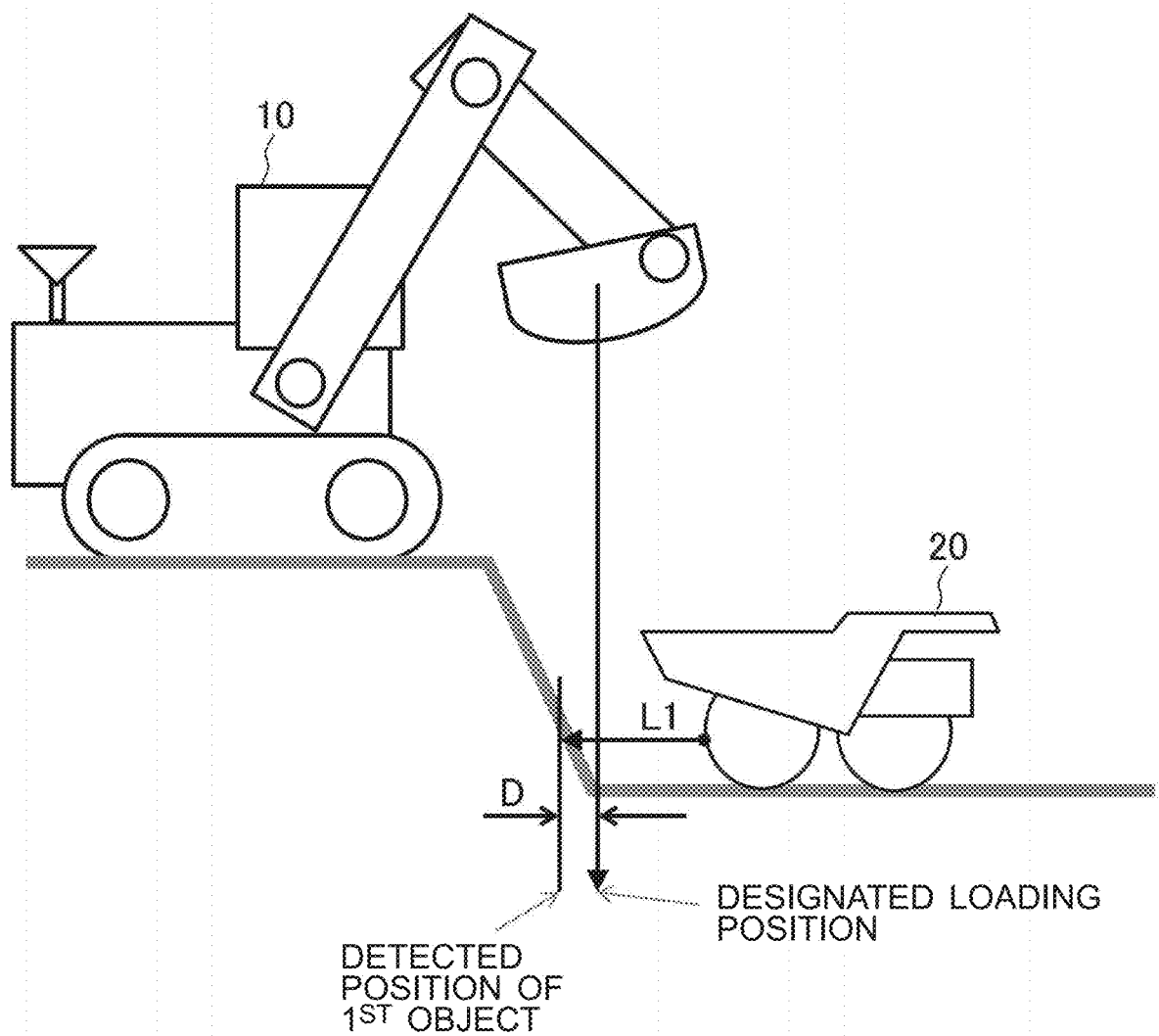

DUMP TRUCK AND REVERSING ASSISTANCE DEVICE

TECHNICAL FIELD

This invention relates to a dump truck and a reversing assistance device, and especially to travel assistance technology useful when a large mining dump truck travels reverse.

BACKGROUND ART

Patent Document 1 discloses a guide device for an unmanned vehicle, "which allows the unmanned vehicle to travel under guidance along a guided course based on a traveling position of the unmanned vehicle as measured by a traveling position measuring means and course data defining the guided course for the unmanned vehicle, and includes a means for inputting the form of a course area, a means for instructing a position of a movement starting point, a direction of the unmanned vehicle at the movement starting point, a position of a movement destination and a vehicle proceeding direction, respectively, a means for generating course data that satisfy the instructed positions and vehicle proceeding direction, a means for predicting any potential interference between the unmanned vehicle and the course area if the unmanned vehicle is allowed to travel based on the generated course data, and a course data changing means for changing the course data if an interference is predicted (Extracted from the Abstract)".

PRIOR ART DOCUMENT

Patent Document

Patent Document 1: JP 2008-097632 A

DISCLOSURE OF THE INVENTION

Problem to be Solved by the Invention

When loading a payload on a dump truck from a hydraulic excavator as a loading machine in a mine, the technology described in Patent Document 1 designates a stop position on an inner side of a boundary between a working face and a haul surface so that a contact with the working face can be avoided. To ensure this avoidance, the positional accuracy of the boundary is important. Patent Document 1 describes to the effect that this boundary is generated according to the movement of the loading machine. There is, however, a potential problem that depending on the manner of excavation by the loading machine, accurate boundaries may not always be acquired. Therefore, boundaries may not always be generated at exact positions, leading to a problem that the target stop position for a haul vehicle as set based on an inaccurate boundary may be too far from the loading machine or may be located at a place where the haul vehicle comes into contact with the working face. There is another potential problem that the existence or non-existence of a utility vehicle cannot be determined by only a boundary between a working face and a haul surface and a target stop position may be set at an inappropriate position from the standpoint of safety in the positional relationship with the utility vehicle. Under real circumstances, there is, accordingly, a desire for the development of reversing assistance technology that can follow changes in the form of a boundary and can avoid an interference with a utility vehicle even if the utility vehicle exists in reverse direction.

With the foregoing in view, the present invention has as an object thereof the provision of reversing assistance technology suited especially for a mining dump truck.

Means for Solving the Problem

To accomplish the above-described object, the present invention provides a dump truck comprising front wheels and rear wheels, a body frame mounted on the front wheels and rear wheels and a vessel mounted on the body frame. The dump truck comprises a first rear monitoring sensor that has a scan direction in a reverse direction of the dump truck, measures a first distance to a first object existing at a first height which is a height of a rear end portion of one of the rear wheels from a contact patch of the one rear wheel, and outputs first distance information indicating the first distance, a second rear monitoring sensor that has a scan direction in the reverse direction of the dump truck, measures a second distance to a second object existing at a second height which is higher than the first height and is a height of a rear end portion of the vessel, and outputs second distance information indicating the second distance, a GPS that acquires own position information of the dump truck, a wireless communication device that receives, via wireless communication network, designated loading position information indicating a designated loading position designated by a loading machine that loads a payload on the vessel of the dump truck, and a reversing assistance device configuring of a travel assistance controller programmed to perform travel assistance when reversing toward the designated loading position. The travel assistance controller is connected at an input interface thereof with the first rear monitoring sensor, the second rear monitoring sensor, the GPS and the wireless communication device, respectively, and at an output interface thereof with an external device. The reversing assistance device comprises an input control section that receives inputs of the first distance information, the second distance information, the own position information, and the designated loading position information, a first object position computing section programmed to compute a position of the first object by using the own position information and the first distance information, a determination distance computing section programed to compute a determination distance which is a distance between the position of the first object and the designated loading position, an approachable object determination section programed to determine the first object to be an approachable object if the determination distance is equal to or smaller than an approachable object determination threshold preset to determine whether the first object is the approachable object, a target stop distance computing section programmed to select, as a target stop distance, a smaller one of the first distance and the second distance if the first object is the approachable object and to compute, as the target stop distance, a distance by subtracting a safe distance, which has been set to avoid an interference to the first object, from the smaller one of the first distance and the second distance if the first object is not the approachable object, a target stop position determination section programmed to determine a target stop position based on the target stop distance and the own position information, and an output control section that outputs target stop position information, which indicates the target stop position, to the external device.

Advantageous Effects of the Invention

According to the present invention, reversing assistance technology suited for a mining dump truck is provided.

Objects, configurations and advantageous effects other than those described above will become apparent from the following description of an embodiment.

BRIEF DESCRIPTION OF THE DRAWINGS

FIG. 7B is an explanatory view illustrating the determination distance D from the loading stop position to the first object and the first distance L1 (as viewed in from the side).

MODES FOR CARRYING OUT THE INVENTION

Using the drawings, a description will hereinafter be made about the embodiment of the present invention. The following description illustrates specific examples of the details of the present invention. Therefore, the present invention is not limited to the following description, but various changes and modifications are feasible by those skilled in the art within the scope of the technical concept disclosed in this description. Throughout all the figures for describing the present invention, members having the same functions are designated by assigning the same numerals or signs, and their repeated descriptions may be omitted.

This embodiment relates to a mining vehicle operation system 1 in which the present invention has been applied to a dump truck that is connected for communication with a control server and performs autonomous traveling according to control instruction information to be received from the control server via wireless communication network.

Figure 1:
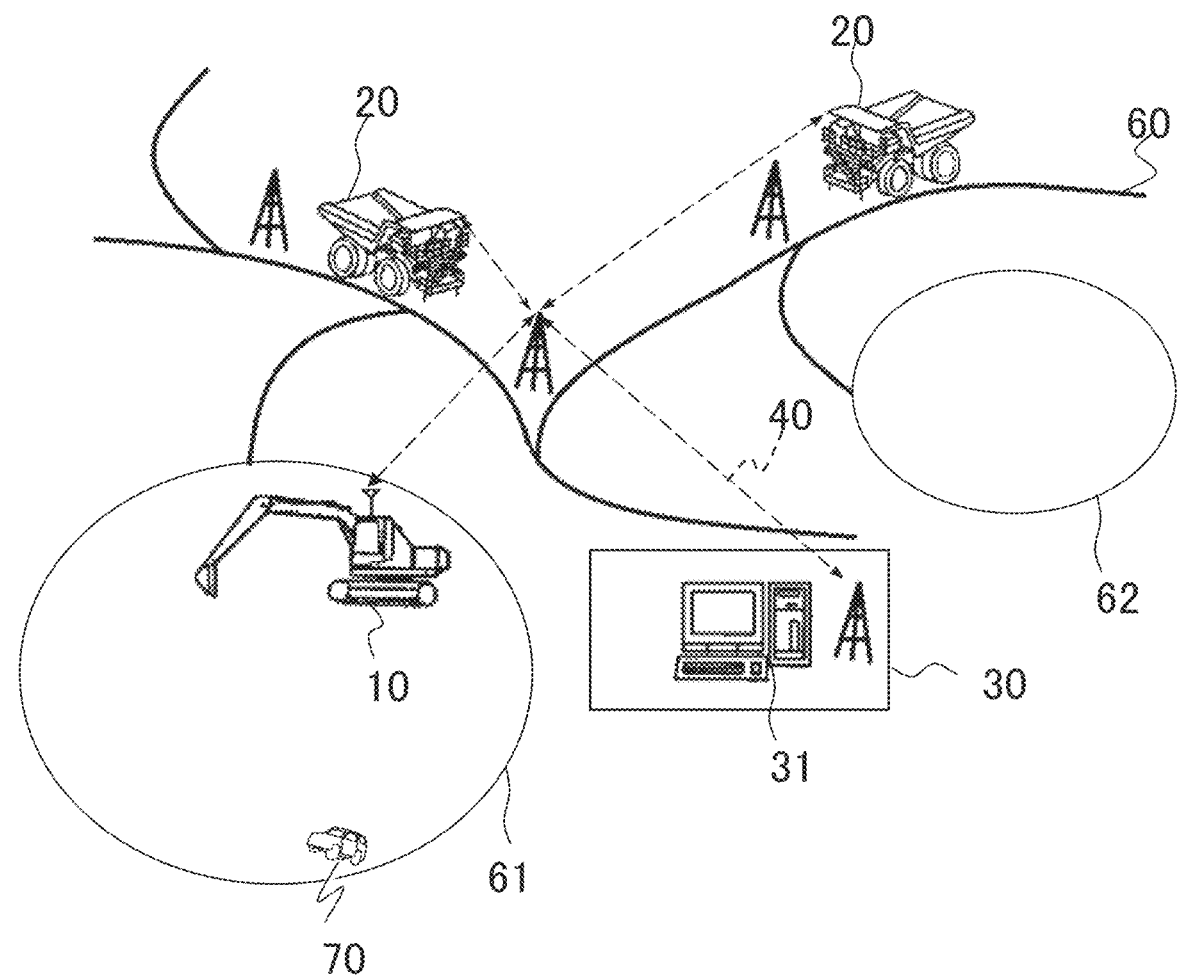
FIG. 1 is a schematic view of a mining vehicle operation system.

FIG. 1 is a schematic view of the mining vehicle operation system 1. As illustrated in FIG. 1, there are a loading site 61, a dumping site 62, and a parking area in a mine. At the loading site 61, ore and soil are excavated by hydraulic excavators 10, and are loaded on dump trucks 20 by wheel loaders or the like. The dump trucks 20 dump the ore and soil loaded at the dumping site 62. At the parking area, vehicles and machines to be operated in the mine are kept parked. The loading site 61, dumping site 62 and parking area are connected together via haul roads 60.

The mining vehicle operation system 1 installed in the mine is constructed by connecting at least one, generally plural dump trucks 20 for communication with a control server 31 installed at a control center 30, respectively, via wireless communication network 40. Each dump truck receives control instruction information transmitted from the control server 31, and autonomously travels according to the control instruction information.

On the haul roads 60 and at the loading site 61, utility vehicles such as graders, bulldozers, sprinkler trucks and light vehicles also travel.

Figure 2A:
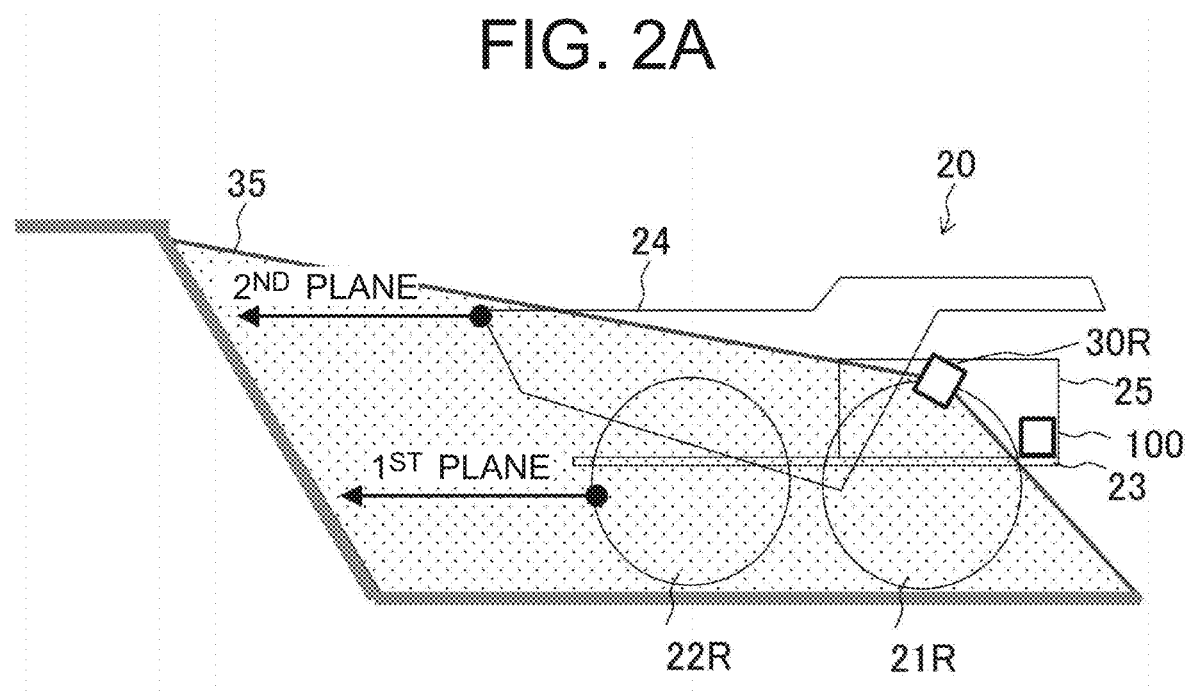
FIG. 2A is a side view of a dump truck.
Figure 2B:
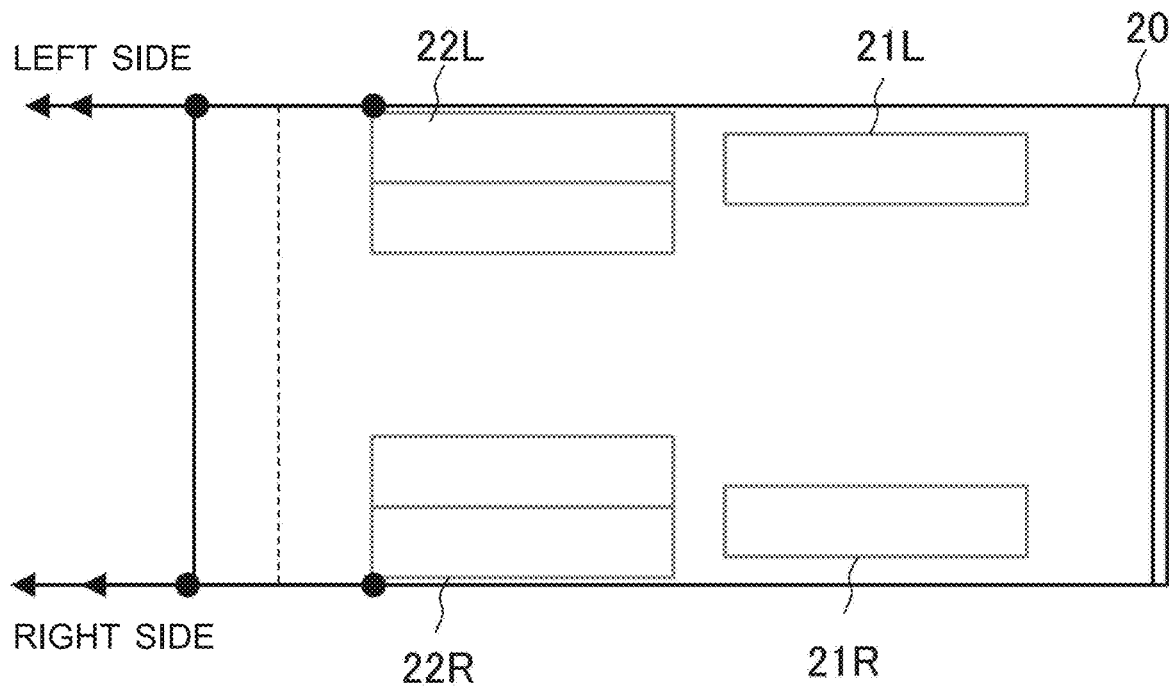
FIG. 2B is a plan view of the dump truck (as seen from the top).

FIG. 2A is a side view of the dump truck, and FIG. 2B is a plan view of the dump truck (as seen from the top). The dump truck 20 includes a right front wheel 21R, a left front wheel 21L, a right rear wheel 22R and a left rear wheel 22L, a body frame 23, a vessel 24 mounted on the body frame 23, and a cab 25 disposed on a front section of the body frame 23. On a right side wall of the dump truck 20, a right rear monitoring sensor 30R is arranged to monitor the right rear area of the dump truck 20, and on the left side wall of the dump truck 20, a left rear monitoring sensor 30L is arranged to monitor the left rear area of the dump truck 20 (see FIG. 2B).

As each of the right rear monitoring sensor 30R and left rear monitoring sensor 30L, it may be possible to use, for example, an infrared distance sensor that can acquire a distance to an object by using a reflection of infrared light, or a distance sensor that can calculate a distance to an object at a symmetric point by a stereoscopic camera which stereoscopically acquires the distance by using two images. Described specifically, the right rear monitoring sensor 30R has a scan direction 35 in the reverse direction of the dump truck 20, measures a first distance from a contact patch of the right rear wheel 22R to a first object existing at a first height which includes a trajectory of the rear wheel during reversing, and outputs first distance information indicating the first distance. In addition, the right rear monitoring sensor 30R also measures a second distance to a second object existing at a second height which is higher than the first height and includes a trajectory of the vessel 24 during the reversing, and outputs second distance information indicating the second distance. Similarly, the left rear monitoring sensor 30L measures a first distance from a contact patch of the left rear wheel 22L to a first object existing at a first height and a second distance from the contact patch of the left rear wheel 22L to a second object existing at a second height, and outputs first distance information and second distance information.

Usable examples of the infrared distance sensor include a fixed IR distance sensor that detects a distance at a point, a planar scan IR distance sensor that can acquire distances to plural points in a plane by moving the direction of radiation of infrared light in the plane, and a spatial scan IR distance sensor that can scan a space by three-dimensionally operating the planar scan IR distance sensor. If fixed IR distance sensors are used, the right rear monitoring sensor 30R and left rear monitoring sensor 30L are configured comprising one of the fixed IR distance sensors, the one fixed IR distance sensor being fixed at the first height, and the other fixed IR distance sensor fixed at the second height, respectively.

As an example, planar scan IR distance sensors are assumed to be used in this embodiment. The planar scan IR distance sensors have a scan range in the form of a two-dimensional plane, and are each disposed to include, in the scan range, an area that extends rearward from below the dump truck 20. By adopting such sensor specification and sensor arrangement, the right rear monitoring sensor 30R and left rear monitoring sensor 30L which are the planar scan IR distance sensors, respectively, can each acquire a point sequence of measuring points on the first height and a point sequence of measuring points on the second height. In other words, the right rear monitoring sensor 30R serves as both the first rear monitoring sensor, which detects the first object existing at the first height, and the second rear monitoring sensor, which detects the second object existing at the second height that is higher than the first height. Similarly, the left rear monitoring sensor 30L also serves as the first rear monitoring sensor and the second rear monitoring sensor.

As another example, the planar scan IR distance sensors may be disposed on a laterally central portion of an axle of the rear wheels and a laterally central portion of a rear end of the vessel, respectively, so that their measuring surfaces lie substantially in parallel to a haul surface.

It is to be noted that in FIG. 2A, the starting point of an arrow for indicating a detection position of each first height is set on a rear end of the right rear wheel 22R or the left rear wheel 22L, and the starting point of an arrow for indicating a detection position of each second height is set on the rear end of the vessel 24. This, however, should not be construed to limit the disposition of the rear monitoring sensors at such positions. The rear monitoring sensors may be arranged at any positions insofar as they can detect the first object and second object.

It is ideal to set, as the scan range, the entire area in a first plane and second plane. However, it is not absolutely necessary to detect the entire area in the first plane and the entire area in the second plane. As illustrated in FIG. 2B, for example, only distances in the vicinities of left and right corners may be used. As appreciated from the foregoing, as the number of the rear monitoring sensors, four sensors may be arranged in total, one at each of four points on the four corners illustrated in FIG. 2B, or two sensors may be arranged in total, one at each of two points of different heights on the dump truck. As a further alternative, a single sensor that includes, in a scan plane thereof, the height direction of the dump truck may be arranged.

Figure 3A:
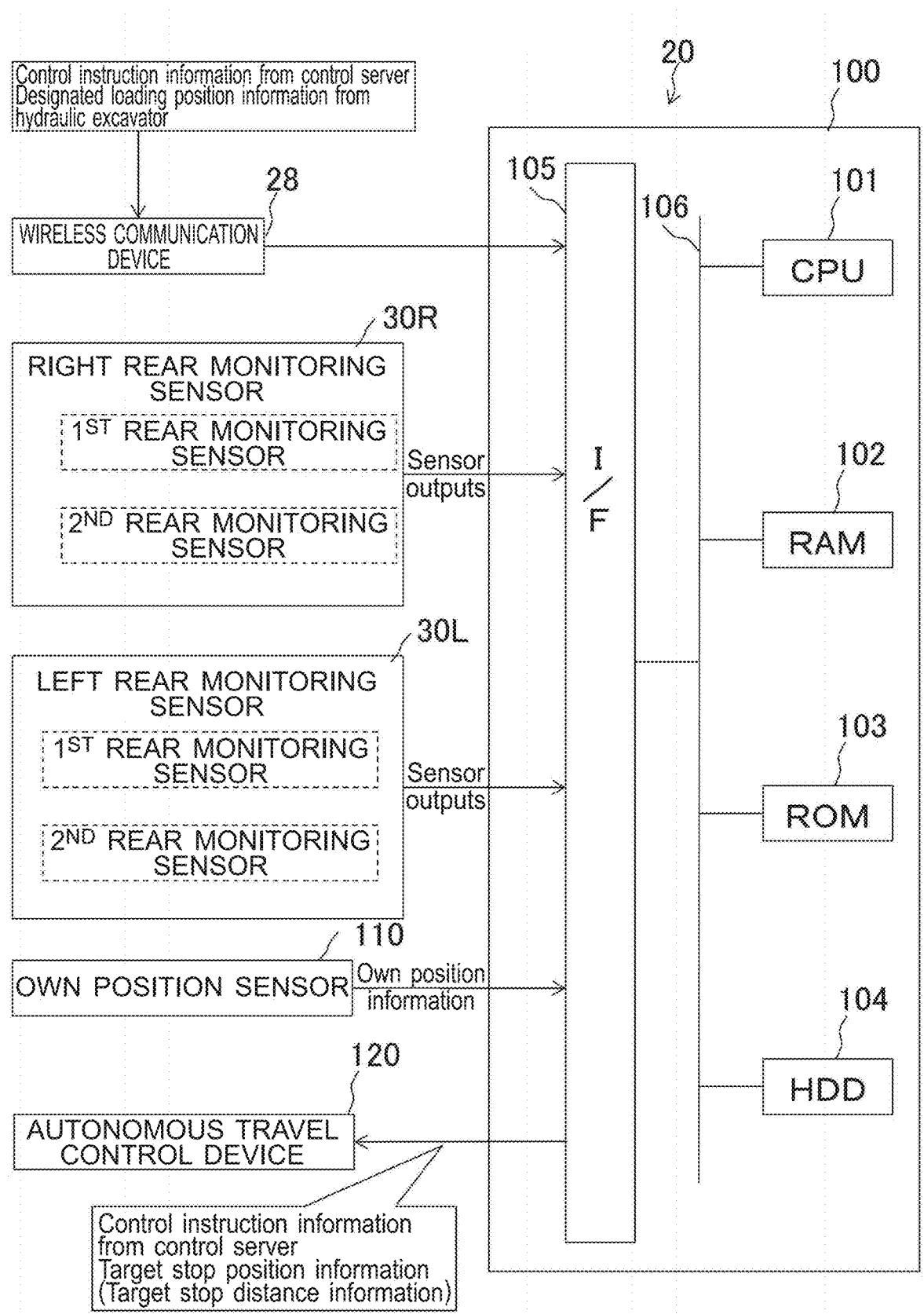
FIG. 3A is a functional block diagram of the dump truck.

FIG. 3A is a functional block diagram of the dump truck. The dump truck 20 includes a reversing assistance device 100. The reversing assistance device 100 is a travel assistance computer comprising a CPU 101, a RAM 102, a ROM 103, a HDD 104, and an interface (I/F) 105 including an input interface and an output interface, which are connected one another via a bus 106. To the input interface of the I/F 105, a wireless communication device 28, the right rear monitoring sensor 30R, the left rear monitoring sensor 30L and an own position sensor 110 are connected, respectively. Connected to the output interface of the I/F 105 is an autonomous travel control device 120, which is a travel controller comprising a computer.

The reversing assistance device 100 receives control instruction information from the control server 31 via the wireless communication device 28, and also receives designated loading position information from the hydraulic excavator 10.

The reversing assistance device 100 receives sensor outputs, which include a first distance L1 as the distance to the first object and a second distance L2 as the distance to the second object, from the right rear monitoring sensor 30R and left rear monitoring sensor 30L, respectively, and also receives own position information from the own position sensor 110 (GPS).

On the other hand, the reversing assistance device 100 outputs, to the autonomous travel control device 120 as an external device, target stop position information determined by the reversing assistance device 100 and the control instruction information received from the control server 31. In addition, the reversing assistance device 100 may also output target stop distance information determined by itself.

Figure 3B:
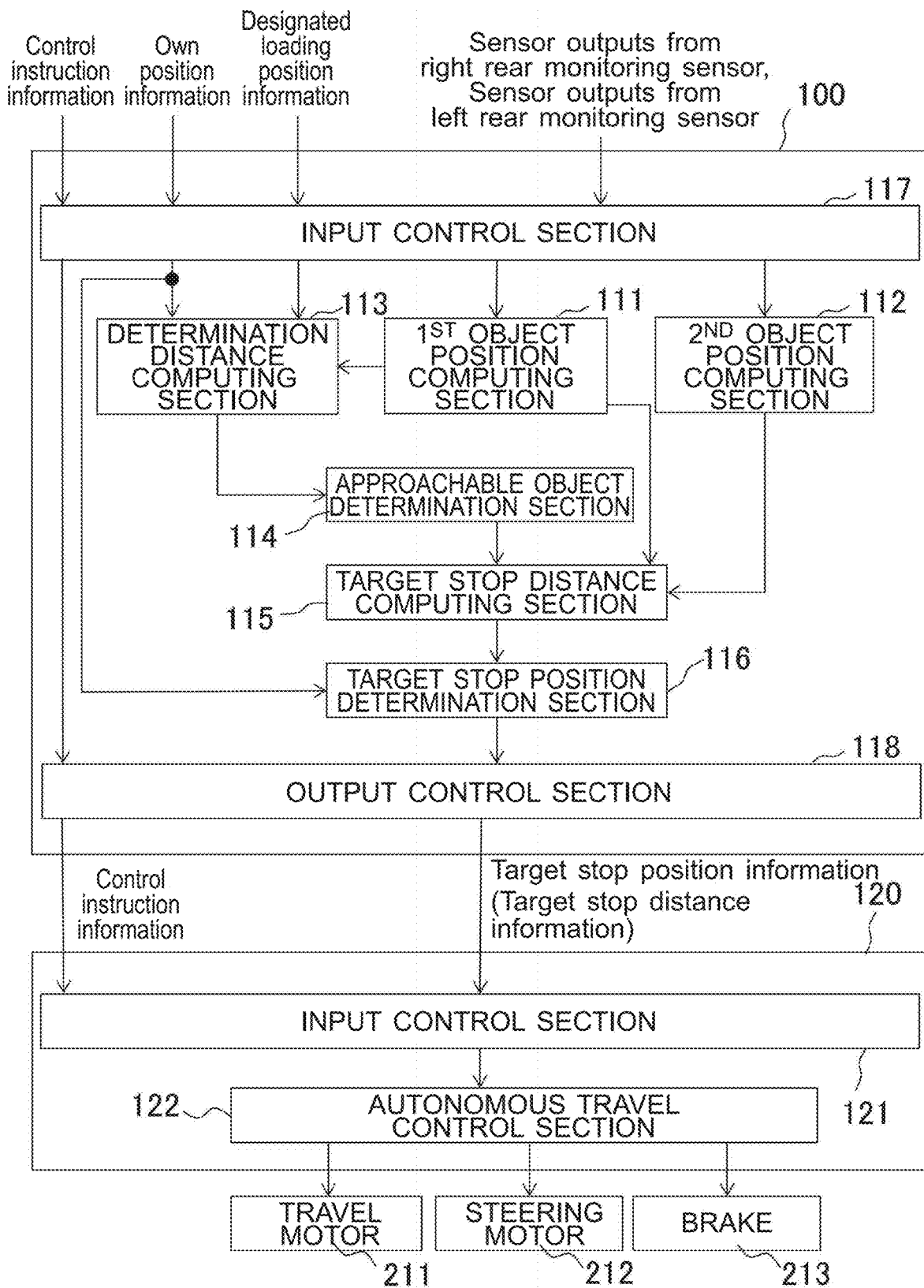
FIG. 3B is a functional block diagram of a reversing assistance device.

FIG. 3B is a functional block diagram of the reversing assistance device. As illustrated in FIG. 3B, the reversing assistance device 100 includes a first object position computing section 111, a second object position computing section 112, a determination distance computing section 113, an approachable object determination section 114, a target stop distance computing section 115, a target stop position determination section 116, an input control section 117, and an output control section 118. These sections may each be configured by a combination of hardware, which consist of the reversing assistance device 100, and software that realizes the function of the section, or may be configured by circuitry. The functions of the individual sections will be described subsequently herein.

The autonomous travel control device 120 includes an input control section 121 and an autonomous travel control section 122. These sections may each be configured by a combination of hardware, which constructs the autonomous travel control device 120, and software that realizes the function of the section, or may be configured by circuitry. The autonomous travel control device 120 is connected to a travel motor 211, a steering motor 212, and a brake 213, and outputs various signals to the travel motor 211, steering motor 212 and brake 213 as needed for allowing the dump truck 20 to autonomously travel according to the control instruction information and target stop position information (which may include the target stop distance information).

Figure 4A:
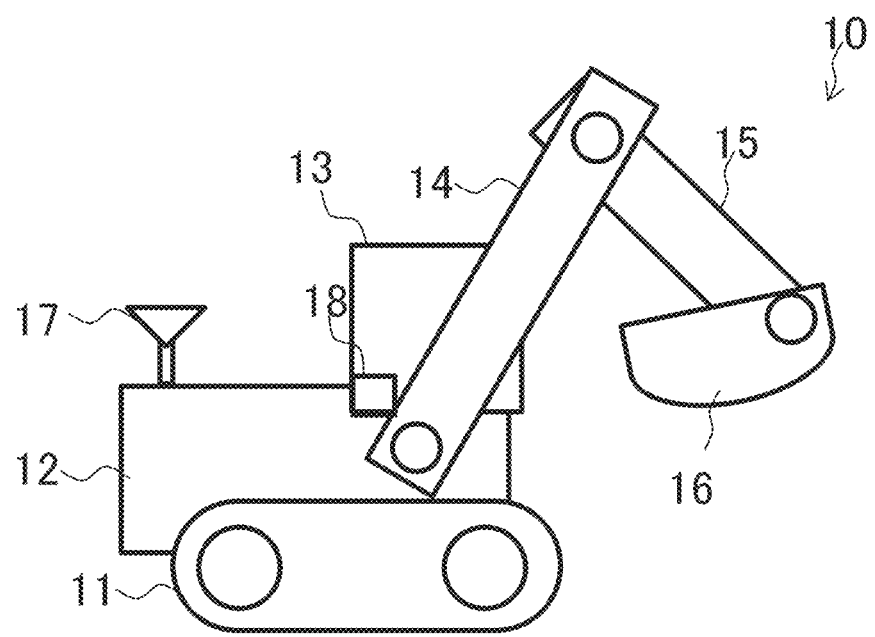
FIG. 4A is a schematic view of a loading machine.

FIG. 4A is a schematic configuration diagram of a loading machine. As illustrated in FIG. 4A, the hydraulic excavator 10 includes an undercarriage 11 having crawlers, an upper structure 12 revolvably supported on the undercarriage 11, an operator's compartment 13 mounted on the upper structure 12, a front working mechanism connected to a front part of the upper structure 12, a position calculating device (GPS) 17 programmed to calculate position information of the hydraulic excavator 10 in an absolute coordinate system, and a loading position designating device 18. The front working mechanism includes a boom 14 supported raisably and lowerably, an arm 15 pivotally supported on a tip of the boom 14, and a bucket 16 pivotally supported on a tip of the arm 15. If an operator of the hydraulic excavator 10 places the bucket 16 at a loading position for the dump truck 20 and designates the loading position, the loading position designating device 18 computes the coordinates of the bucket 16 in the absolute coordinate system at this time.

Figure 4B:
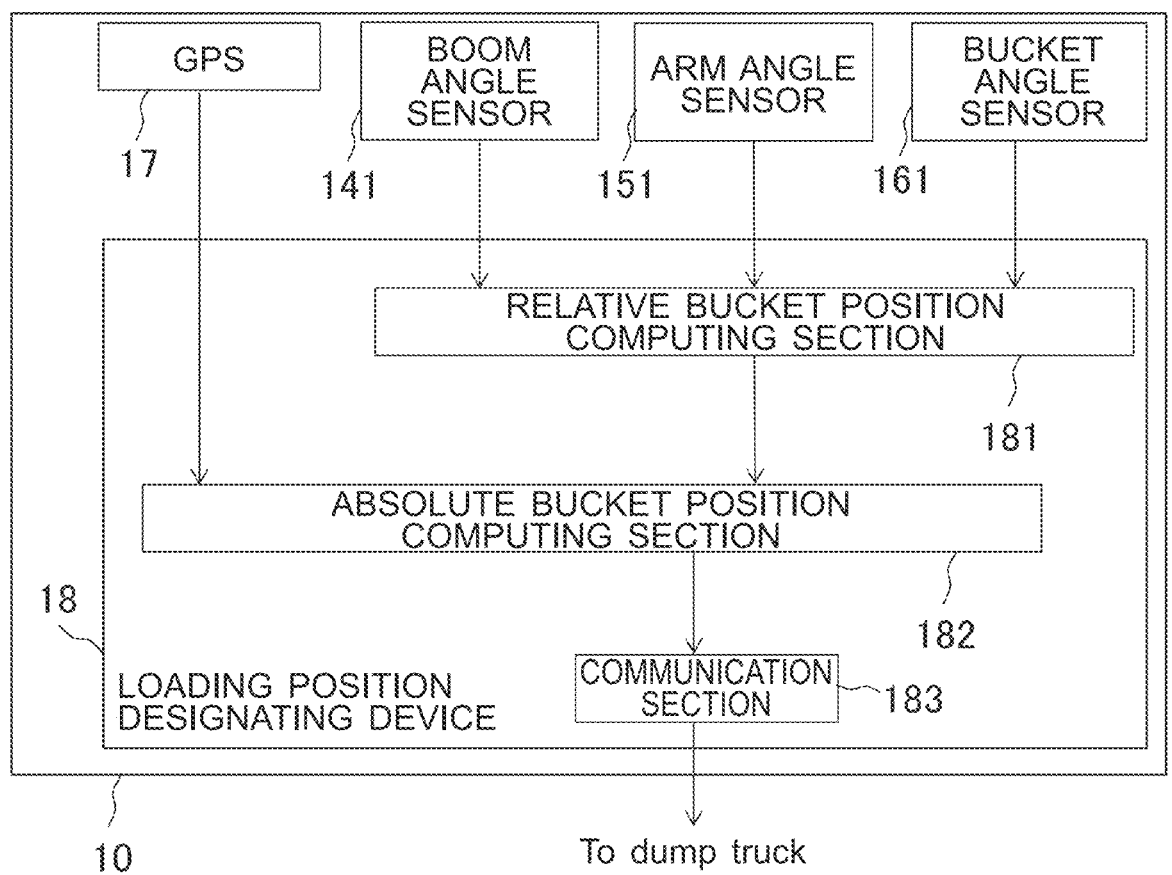
FIG. 4B is a functional block diagram of a loading position designating device.

FIG. 4B is a functional block diagram of the loading position designating device 18. The hydraulic excavator 10 includes a boom angle sensor 141 for detecting the angle of elevation of the boom 14, an arm angle sensor 151 for detecting a pivot angle of the arm 15, and a bucket angle sensor 161 for detecting a pivot angle of the bucket 16. The loading position designating device 18 includes a relative bucket position computing section 181, an absolute bucket position computing section 182, and a communication section 183. The relative bucket position computing section 181 computes the relative position of the bucket 16 to the hydraulic excavator 10 based on outputs from the boom angle sensor 141, arm angle sensor 151 and bucket angle sensor 161. The absolute bucket position computing section 182 computes the absolute position of the bucket 16 by adding the relative position of the bucket 16, which has been computed by the relative bucket position computing section 181, to the position information of the hydraulic excavator 10 in the absolute coordinate system as acquired from the GPS 17. The communication section 182 transmits the designated loading position information, which is the absolute position of the bucket 16, to the dump truck 20.

The designating operation of the loading position may be programmed so that environmental information around the loading machine is displayed on a display disposed in the operator's compartment of the hydraulic excavator 10 and the operator can designate a stop position on the display. After this designating operation of the loading position has been performed, the loading position designating device 18 acquires outputs from the boon angle sensor 141, arm angle sensor 151, bucket angle sensor 161 and GPS 17 at that time, computes the absolute position of the bucket, and outputs it as a designated loading position.

Hereinafter, a description will be made about an example in which the reversing assistance device according to this embodiment is used during so-called bench cutting that the hydraulic excavator 10 is placed at a position higher than the contact patch of the right rear wheel 22R of the dump truck 20, excavates a working face, and loads a payload onto the dump truck 20 waiting on a lower bench.

As illustrated in FIG. 2A, the dump truck 20 protrudes at two up-and-low height positions, one being the rear end of the right rear wheel 22R when the body is seen from the side, in other words, a horizontal rear end at the center of the tire height, and the other the rear end of the vessel 24, and has a high risk of contact with objects at these positions. It is, therefore, required to avoid contact in these two planes during reversing.

Now, the hydraulic excavator 10 is presumed to exist in the vicinity of a working face in view of the nature of work that excavates the working face itself. Because the bucket 16 of the hydraulic excavator 10 does not reach very far, the designated loading position that the operator of the hydraulic excavator 10 designates is chosen in the vicinity of the working face in many instances from the consideration of work efficiency. Therefore, an object that is detected at a position close to the designated loading position can be considered to be the working face.

The working face is presumed to continuously rise from the contact patch of the right rear wheel 22R. The form of the working face changes successively as the excavation work proceeds. However, the working face has an artificial form to be shaped by excavation work, and therefore is assumed to be in a planar form excavated without any substantial prominences from the contact patches of the front wheels 21 and rear wheels 22 of the dump truck 20. In this case, during reversing of the dump truck 20, the working face is definitely detected at the first height when the dump truck 20 has approached sufficiently close to the working face. From the foregoing, if the position of the first object detected at the first height which is the height of the rear end portion of each rear wheel 22 is sufficiently close to the designated loading position designated by the operator of the hydraulic excavator 10, the first object is determined to be the working face. If the position of the first object detected at the first height is apart from the designated loading position, on the other hand, the object can be considered not to be the working face. If the object is not the working face, it is unnecessary for the dump truck 20 to approach the object. Actually, the object is presumed to be the utility vehicle 70 such as a bulldozer. It is, therefore, considered that the dump truck 20 should stop at a position with a safe distance remaining to the object.

Here, the dump truck 20 determines whether the first object is the working face. If determined to be the working face, the distance to the first object (the first distance L1) as detected by the first rear monitoring sensor and the distance to the second object (the second distance L2) as detected by the second rear monitoring sensor are compared with each other, and the smaller distance is set as a target stop distance. Further, if determined not to be the working face, the first distance L1 and the second distance L2 are compared with each other, a target stop distance is calculated using the smaller distance, the own position and a distance for safety (which will hereinafter be referred to as "the safe distance Ds"), and a target stop position is determined based on the target stop distance and the own position.

Figure 5:
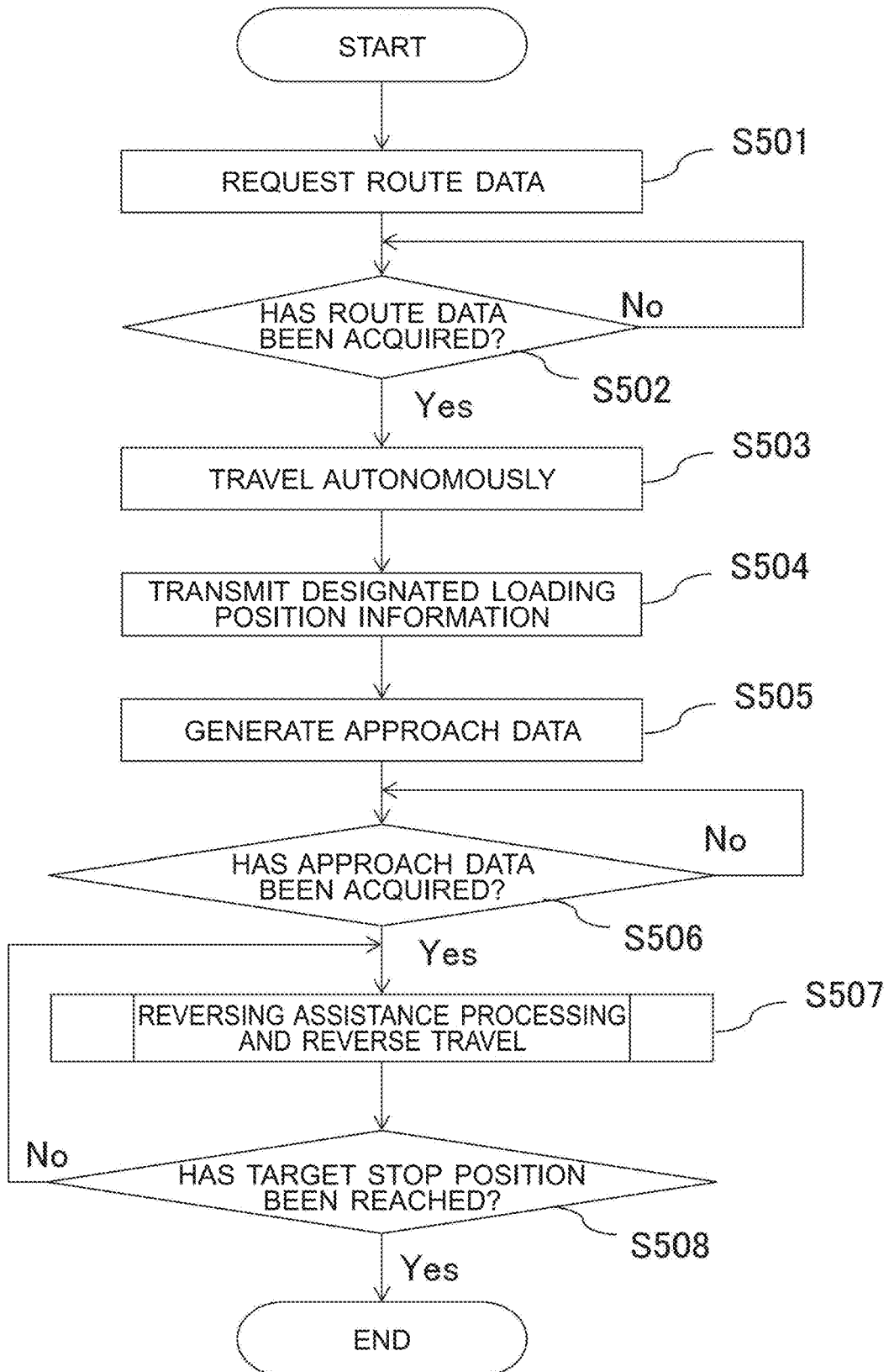
FIG. 5 is a flowchart illustrating an outline flow when reversing toward a loading position and stopping at the loading position.

Hereinafter, a description will be made about processing that, while using the reversing assistance device, allows the dump truck 20 to autonomously travel toward a loading position designated by the operator of the hydraulic excavator 10 and to stop at a target stop position. FIG. 5 is a flow chart illustrating an outline flow when reversing toward the loading position and stopping at the loading position.

After discharging the payload at the dumping site 62, the dump truck 20 travels on the haul road 60 toward the loading site 61. At an entrance to the loading site 61, the dump truck 20 transmits, to the control server 31, a request for route data to travel toward the hydraulic excavator 10 across the loading site 61 (S501).

The control server 31 generates the route data responsive to the request, and transmits the route data as control instruction information back to the dump truck 20. If the dump truck 20 has acquired the route data (S502/Yes), the dump truck 20 autonomously travels according to the route data (S503). Otherwise (S502/No), the dump truck 20 waits until the route data is acquired.

If the operator of the hydraulic excavator 10 performs a designating operation for a loading position, the loading position designating device 18 transmits designated loading position information, which indicates the absolute position of the designated loading position, to the dump truck 20 and control server 31 (S504).

The control server 31 generates approach data (S505), which includes a switch-back point and indicates a route to the loading position indicated by the designated loading position information. The approach data is transmitted from the control server 31 to the dump truck 20, and is acquired by the dump truck 20 (S506/Yes). Until the approach data is acquired (S506/No), the dump truck 20 waits at the switch-back point.

The dump truck 20 reverses along the route, which is indicated by the approach data, under travel assistance by the reversing assistance device 100 (S507). Reversing assistance processing and the reverse travel are continued until the dump truck 20 reaches the target stop position determined by the reversing assistance device 100 (S508/No). If the dump truck 20 has reached the target stop position (S508/Yes), the dump truck 20 stops and the reversing assistance processing is ended.

Figure 6:
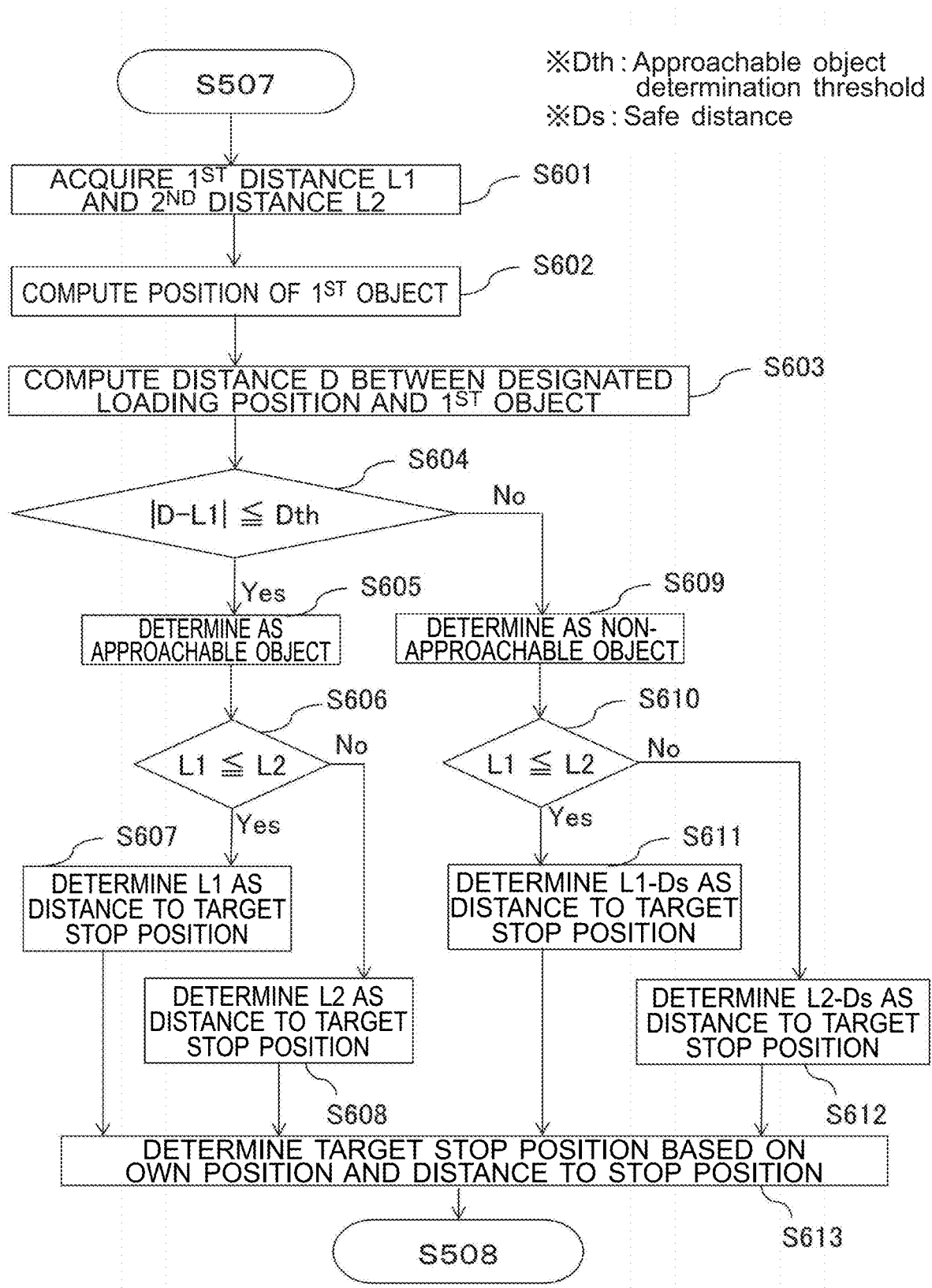
FIG. 6 is a flow chart illustrating a flow of reversing assistance processing.
Figure 7A:
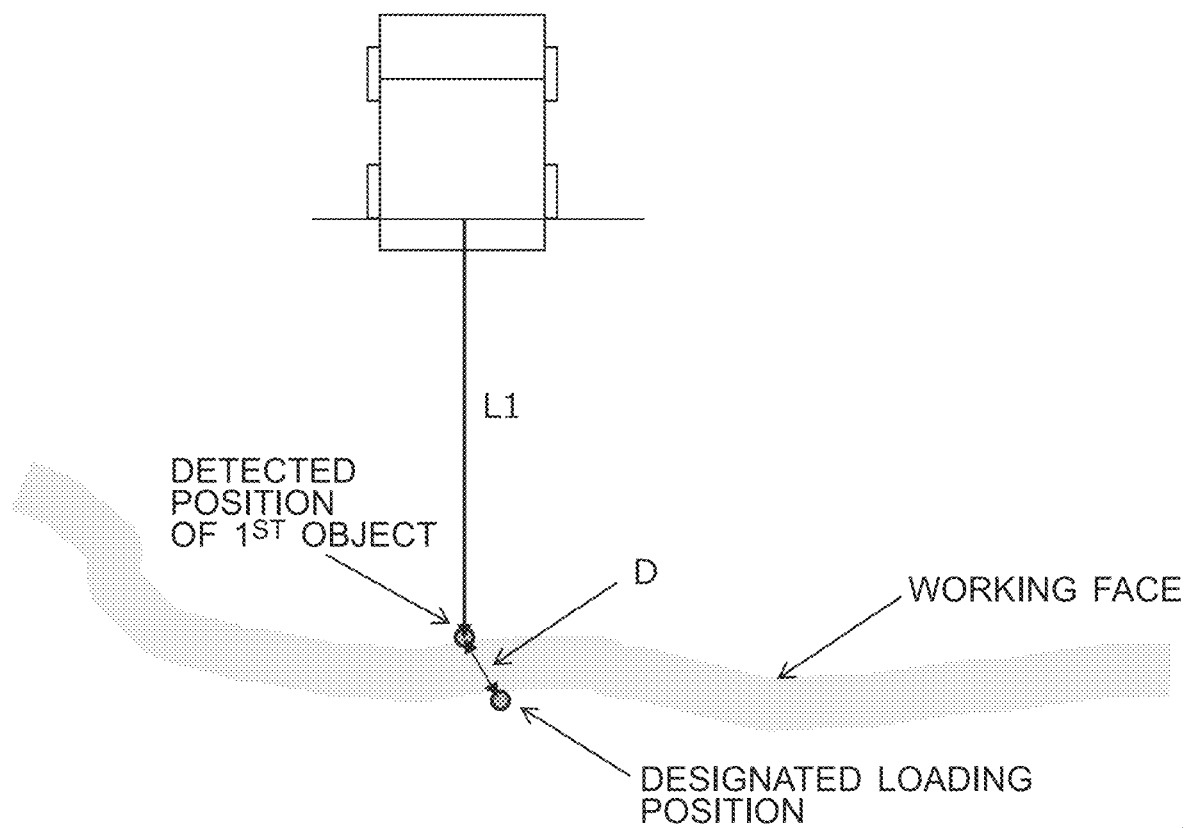
FIG. 7A is an explanatory view illustrating a determination distance D from a loading stop position to a first object and a first distance L1 (as viewed in plan).
Figure 8:
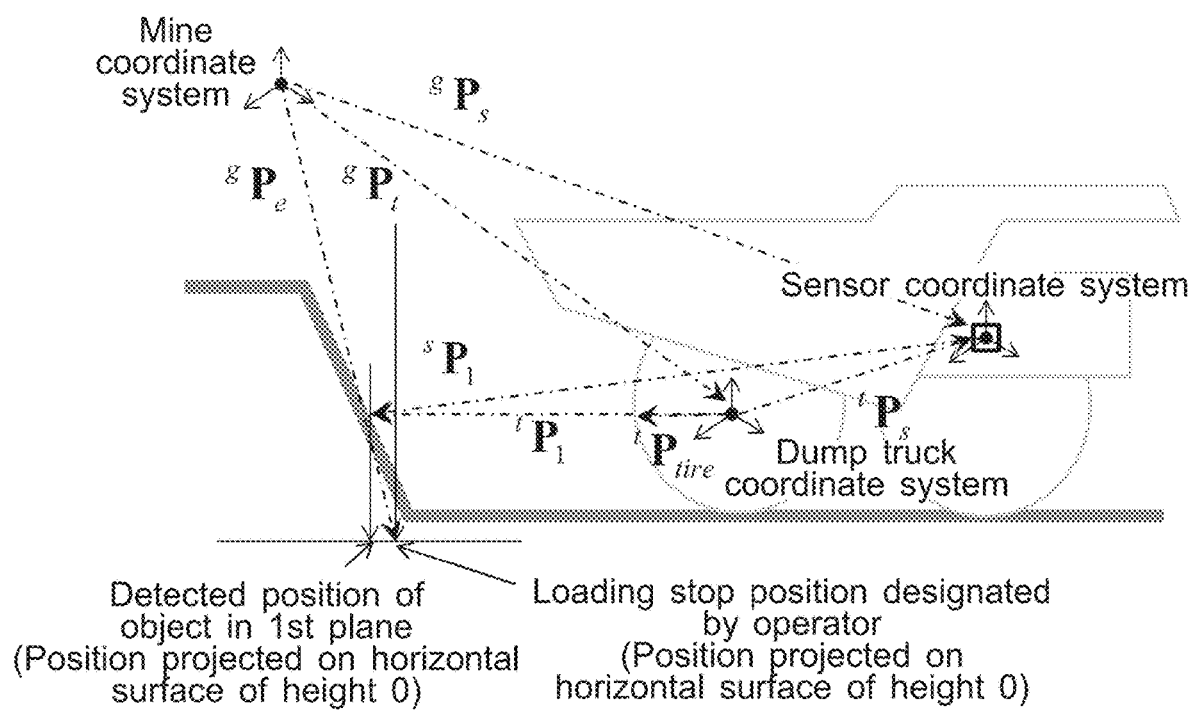
FIG. 8 is a view illustrating coordinate conversion processing performed in steps S602 and S603.
Figure 9A:
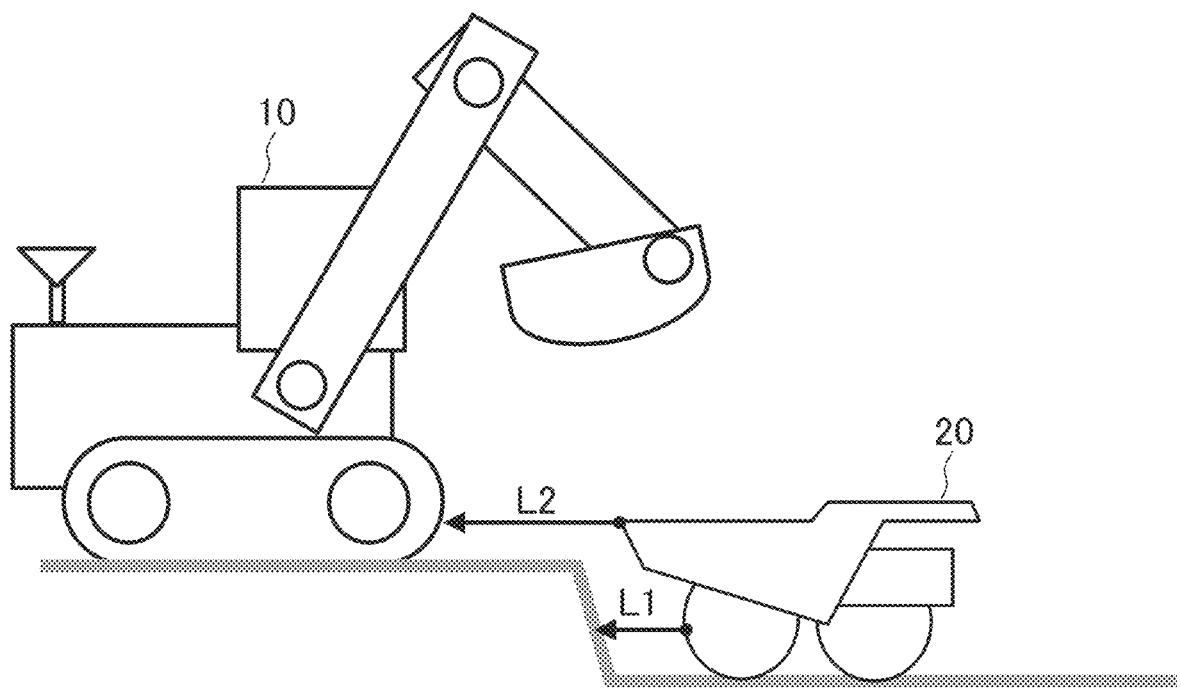
FIG. 9A is a view illustrating an example of a relationship in magnitude between the first distance L1 and the second distance L2.
Figure 9B:
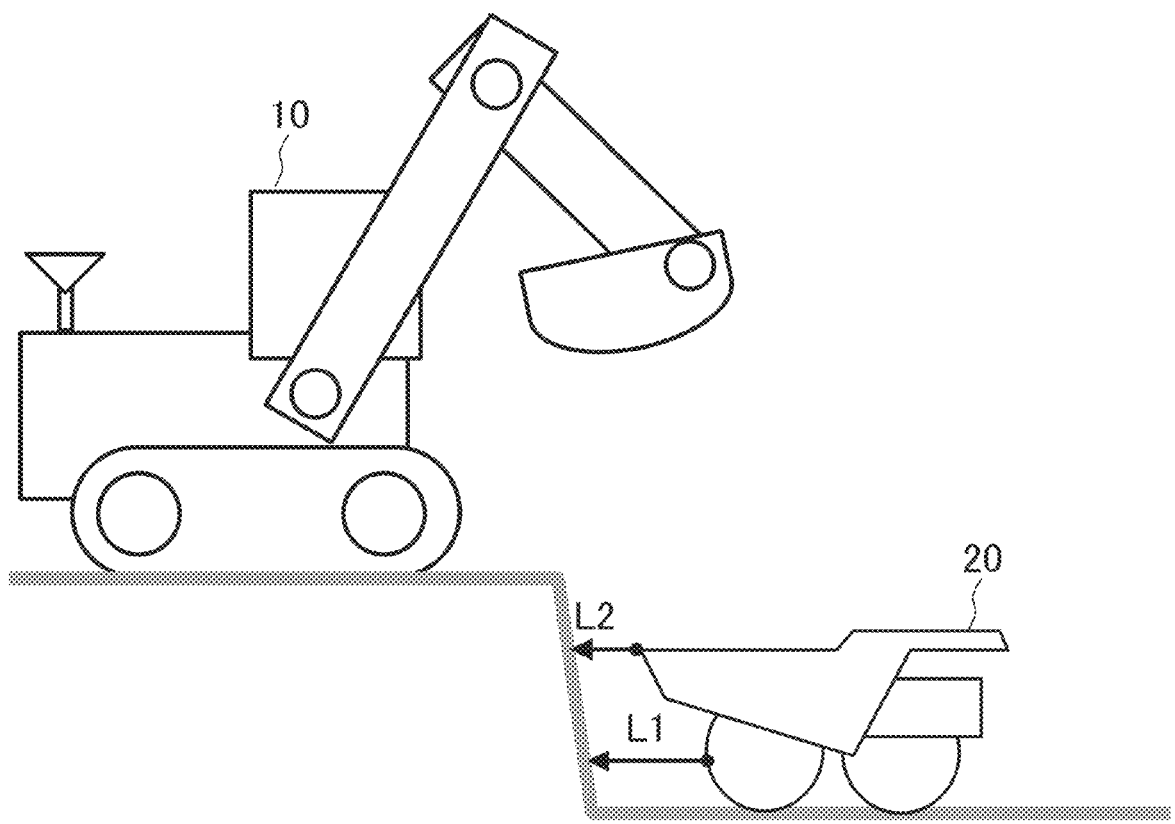
FIG. 9B is a view illustrating another example of the relationship in magnitude between the first distance L1 and the second distance L2.

A description will next be made about the reversing assistance processing in step S507. FIG. 6 is a flow chart illustrating a flow of the reversing assistance processing. FIG. 7A is an explanatory view (as viewed in plan) illustrating a determination distance D from the loading stop position to the first object and the first distance L1. FIG. 7B is an explanatory view (as viewed from the side) illustrating the determination distance D from the loading stop position to the first object and the first distance L1. FIG. 8 is a view illustrating coordinate conversion processing to be performed in steps S602 and S603. FIGS. 9A and 9B are views illustrating examples of a relationship in magnitude between the first distance L1 and the second distance L2.

The input control section 117 of the reversing assistance device 100 receives, as inputs, the control instruction information, the own position information, the designated loading position information, and sensor outputs from the right rear monitoring sensor 30R and left rear monitoring sensor 30L. The first object position computing section 111 and second object position computing section 112 acquire the sensor outputs (which include the first distance L1 and second distance L2) from the right rear monitoring sensor 30R and left rear monitoring sensor 30L, respectively (S601). The first distance L1 and second distance L2 are each determined as two pieces of data based on the corresponding outputs from the right rear monitoring sensor 30R and left rear monitoring sensor 30L. Of these two pieces of data, one, for example, the smaller one may be selected to perform the subsequent processing. As an alternative, the first distance L1 and second distance L2 outputted from the right rear monitoring sensor 30R may be used to perform the subsequent processing, or the first distance L1 and second distance L2 outputted from the left rear monitoring sensor 30L may be used to perform the subsequent processing.

The first object position computing section 111 computes the position of the first object in the absolute coordinate system by using the first distance L1 and the own position information (S602).

The determination distance computing section 113 computes the distance between the designated loading position and the position of the first object (which will hereinafter be referred to as "the determination distance D") based on the designated loading position information and the first object position information obtained from the first object position computing section 111 (S603).

With reference to FIG. 8, a description will be made about the coordinate conversion processing to be per formed by the first object position computing section 111 and determination distance computing section 113. In FIG. 8, a mine coordinate system is represented by a superscript g, a dump truck coordinate system is represented by a super- or subscript t, and a sensor coordinate system is represented by a super- or subscript s. The designated loading position designated by the operator of the hydraulic excavator 10 is assumed to be defined as coordinates $^{g}P_{e}$ represented in the mine coordinate system. On the other hand, the position of the dump truck is assumed to be defined as coordinates $^{g}P_{t}$ of the center of the axle between the rear wheels as represented in the mine coordinate system.

In the coordinate conversion processing, there are three coordinate systems, that is, the mine coordinate system, a sensor coordinate system, and a dump truck coordinate system. The sensor coordinate system can be converted to the mine coordinate system by using a geometric positional relationship between the fixed positions of the right rear monitoring sensor and left rear monitoring sensor on the dump truck and an own position calculation reference point on the body of the dump truck as calculated by the own position sensor. Therefore, by the following mathematical formulas, the first object position computing section 111 determines the coordinates of the designated loading position and the coordinates of the position of the first object, and the determination distance computing section 113 computes the determination distance D.

$$^{t}P_{1} = {}^{t}R_{s}{}^{s}P_{1} + {}^{t}P_{s}$$

$$^{g}P_{1} = {}^{g}R_{t}{}^{t}P_{1}{}^{g}P_{t} = {}^{g}R_{t}({}^{t}R_{s}{}^{s}P_{1} + {}^{t}P_{s}) + {}^{g}P_{t}$$

$$L1 = |{}^{t}P_{1} - {}^{t}P_{tire}|$$

$$D = |{}^{g}P_{e} - {}^{g}P_{1}| \text{ (projected on a horizontal plane of height 0)}$$

where:
$^{g}R_{t}$ Posture of the dump truck coordinate system as seen from the mine coordinate system
$^{t}R_{s}$ Posture of the sensor coordinate system as seen from the dump truck coordinate system
$^{t}P_{1}$ Position of the first object as seen from the dump truck coordinate system
$^{s}P_{1}$ Position of the first object as seen from the sensor coordinate system
$^{t}P_{s}$ Position of the sensor coordinate system as seen from the dump truck coordinate system
$^{g}P_{1}$ Position of the first object as seen from the mine coordinate system
$^{t}P_{tire}$ Position of the rear end of the rear tire as seen from the dump truck coordinate system
$^{g}P_{e}$ Designated loading position as seen from the mine coordinate system
$^{g}P_{t}$ Position of the dump truck as seen from the mine coordinate system The approachable object determination section 114 determines whether the determination distance D is equal to or smaller than a preset approachable object determination threshold Dth (S604).

If the determination result in step S604 is affirmative (S604/Yes), the first object is determined to be an approachable object (S605), and the determination result is outputted to the target stop distance computing section 115. The term "approachable object" as used herein means an object an interference with which is permissible for the dump truck 20 even if any, and corresponds to a working face in this example. Defining it from a difference from a non-approachable object, an object that does not require keeping the safe distance Ds in the computation of a target stop distance to be described subsequently herein can be said to be an approachable object, whereas an object that requires keeping the safe distance Ds can be said to be a non-approachable object.

The target stop distance computing section 115 compares the first distance L1 and the second distance L2 (S606). If the first distance L1 is equal to or smaller than the second distance L2 (S606/Yes, see FIG. 9A), the target stop distance computing section 115 determines the first distance L1 as the distance to the target stop position (S607). If the first distance L1 is greater than the second distance L2 (S606/No, see FIG. 9B), the target stop distance computing section 115 determines the second distance L2 as the distance to the target stop position (S608).

If the determination result in step S604 is negative (S604/No), the first object is determined to be a non-approachable object (for example, a utility vehicle) (S609), and the determination result is outputted to the target stop distance computing section 115.

The target stop distance computing section 115 compares the first distance L1 and the second distance L2 (S610). If the first distance L1 is equal to or smaller than the second distance L2 (S610/Yes), the target stop distance computing section 115 uses the safe distance Ds which is a preset margin, and determines a value, which has been acquired by subtracting the safe distance Ds from the first distance L1, as a distance to the target stop position (S611). If the first distance L1 is greater than the second distance L2 (S610/No), however, the target stop distance computing section 115 determines a value, which has been acquired by subtracting the safe distance Ds from the second distance L2, as the distance to the target stop position (S612). As the safe distance Ds, a value of 10 m or greater may be used, for example.

Figure 10:
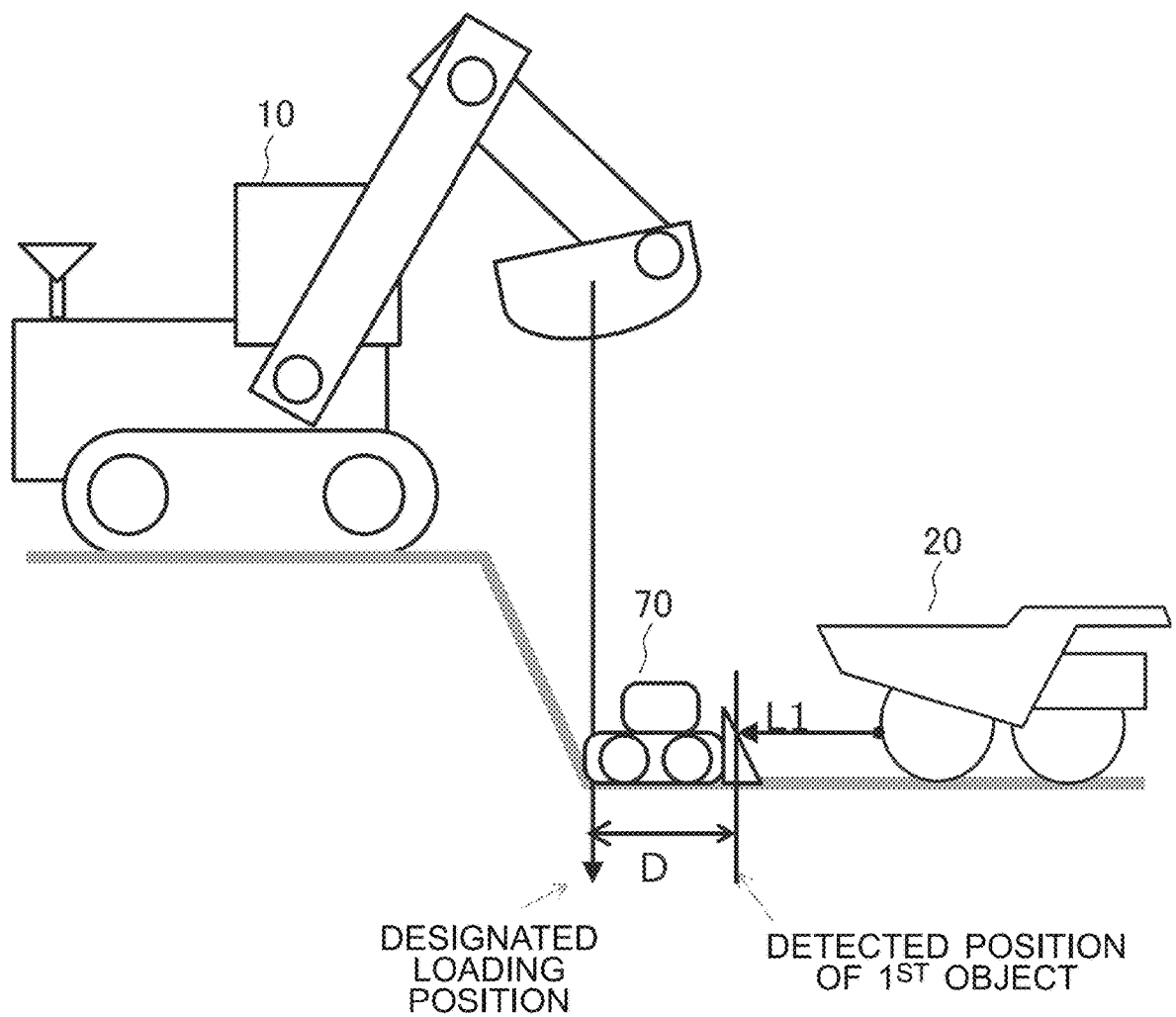
FIG. 10 is a view illustrating an example in which the result of a determination in step S604 is negative.

FIG. 10 is a view illustrating an example in which the determination result in step S604 is negative. The utility vehicle 70 exists between the working face and the dump truck 20. In this case, the right rear monitoring sensor 30R and left rear monitoring sensor 30L detect, as the first object, the utility vehicle 70 instead of the working face. The determination distance D is the distance from the loading stop position to a point on the utility vehicle 70, the point being closest to the dump truck 20 (the first object detection position). In general, the designated loading position is designated near the working face so that the absolute value of (D-L1) becomes greater than Dth.

Figure 11:
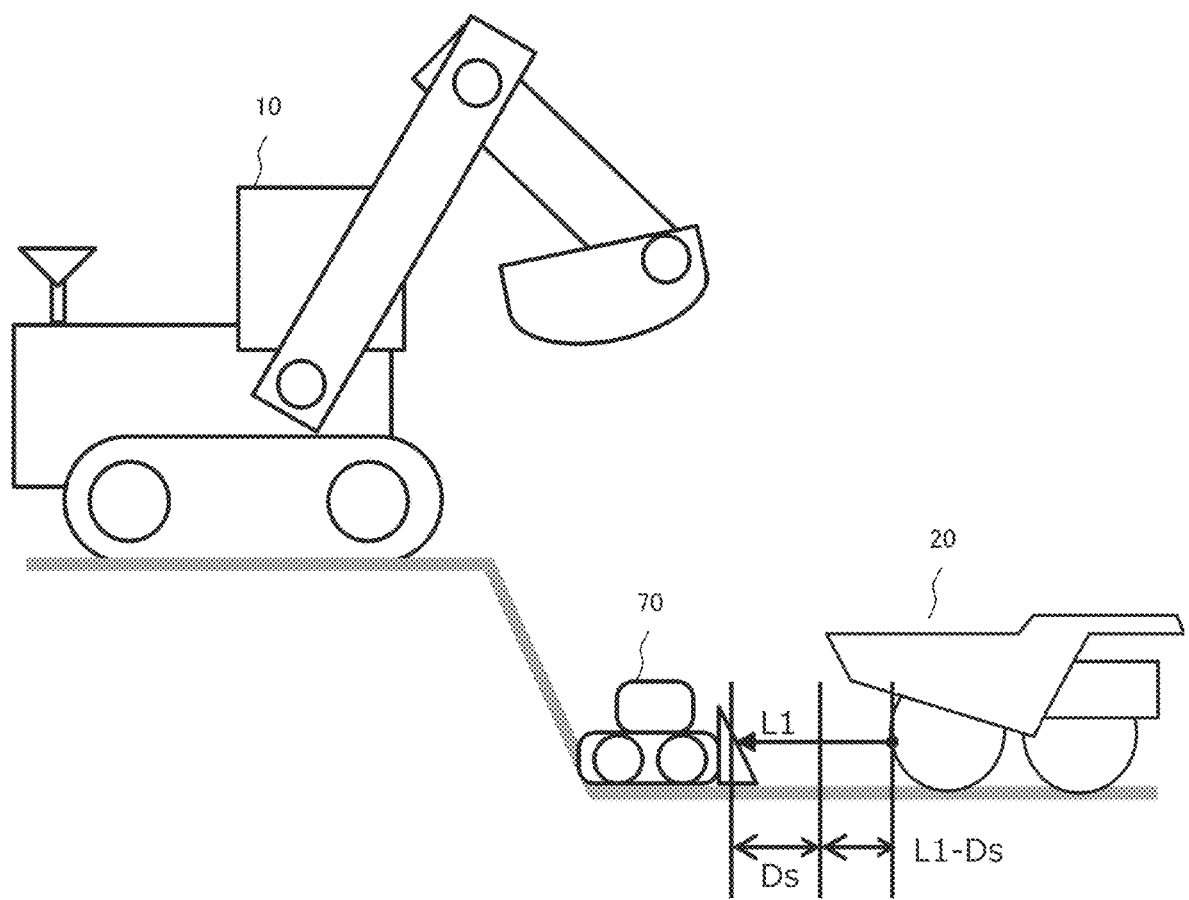
FIG. 11 is a view illustrating an example of a determination of a distance to a target stop position in step S611.

FIG. 11 is a view illustrating an example of the determination of the distance to the target stop position in step S611. As the utility vehicle 70 exists closer than the working face, a position still closer by the safe distance Ds as the margin than the first object detection position is set as the target stop position to avoid any interference with the utility vehicle 70. Therefore, the target stop distance computing section 115 calculates the target stop distance by subtracting the safe distance Ds from the first distance L1. FIG. 11 has been described by taking the first distance L1 as an example. If the second distance L2 is smaller than the first distance L1, however, replacement of the first distance L1 with the second distance L2 is simply needed.

The target stop position determination section 116 then determines the target stop position by using the target stop distance and the own position (S613). If the processing has proceeded to this step from step S607 or S608, the target stop position is determined to be at a position where the (D-L1) or (D-L2) decreases to around 0 because it is considered efficient to stop in the vicinity of the working face.

If the processing has proceeded to this step from step S611 or S612, on the other hand, the first object or second object can be a utility vehicle such as a bulldozer so that the dump truck 20 should not approach the first object or second object and should stop at a position with the safe distance Ds remaining to it. Therefore, the target stop position is determined so that the dump truck 20 stops at a position where the distance, which takes the safe distance Ds into account in addition to the distance to the target, decreases to around 0.

According to this embodiment, when reversing to a loading stop position designated by the operator of the hydraulic excavator 10, a position with a safe distance remaining to a non-approachable object is determined to be a target stop position if the non-approachable object exists between the own vehicle and the loading stop position. Otherwise, the loading stop position is determined to be the target stop position. The dump truck 20 then reverses toward the target stop position. Upon determination of the target stop position, no boundary is used between the haul surface and a part other than the haul surface, for example, the working face, so that renewal of such a boundary is no longer needed and, even if the position and form of such a boundary change successively, the acquisition of such changes are not needed either. Improvements can hence be expected in work efficiency.

Figure 12:
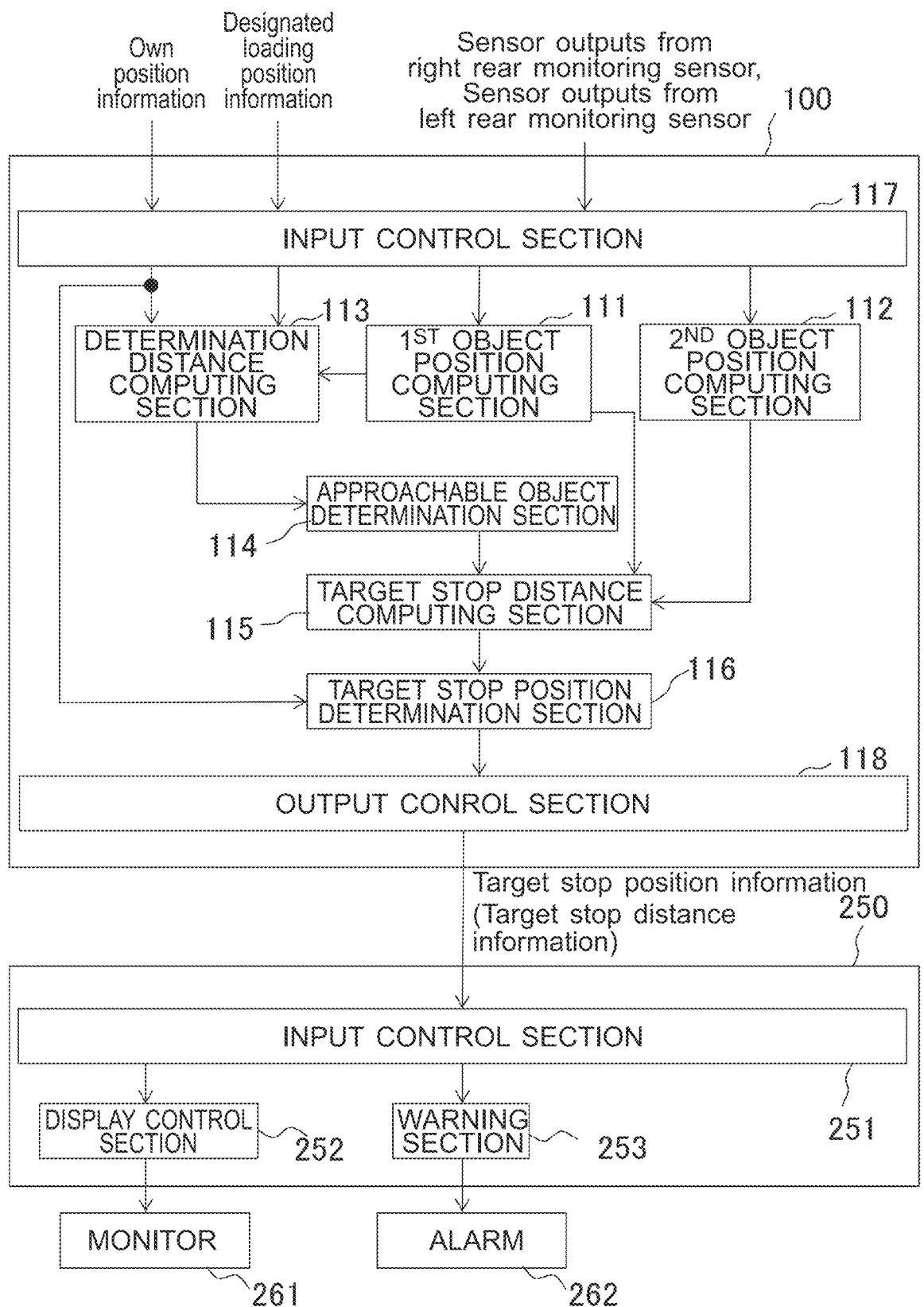
FIG. 12 is a functional block diagram of a reversing assistance device and external devices mounted on a manned dump truck.

This embodiment has been described by taking the autonomous vehicle as an example. This invention may, however, be also applied to the reversing assistance of a so-called manned dump truck that an operator is aboard a dump truck 20 and the dump truck 20 is caused to travel according to operation by the operator. FIG. 12 is a functional block diagram of a reversing assistance device and external devices mounted on a manned dump truck, and FIG. 13 is a functional block diagram of other examples of the reversing assistance device and external devices mounted on the manned dump truck.

As illustrated in FIG. 12, the output interface of the reversing assistance device 100 and the input interface of an information providing device 250 (an information providing controller comprising a computer) arranged in the cab 25 of the dump truck 20 are connected to each other, and at least one of a monitor 261 or an alarm 262 is connected to the output interface of the information providing device 250. The information providing device 250 includes an input control section 251, a display control section 252, and a warning section 253. The display control section 252 may display, on the monitor 261, an image indicating a target stop position that has been determined. Grasping of a positional relationship between the own vehicle and the target stop position can be facilitated by also displaying the position of the own vehicle on the screen of the monitor 261 at the same time. In addition, a target stop distance may also be displayed as a numerical value. These displays can notify the operator of the reversing travel distance to the target stop position, and can perform operation assistance.

The reversing assistance device and external devices may also be configured so that, if the determination in step S604 has resulted in negative, for example, information including the result is outputted to the information providing device 250 and the warning section 253 outputs a warning from the alarm 262.

Figure 13:
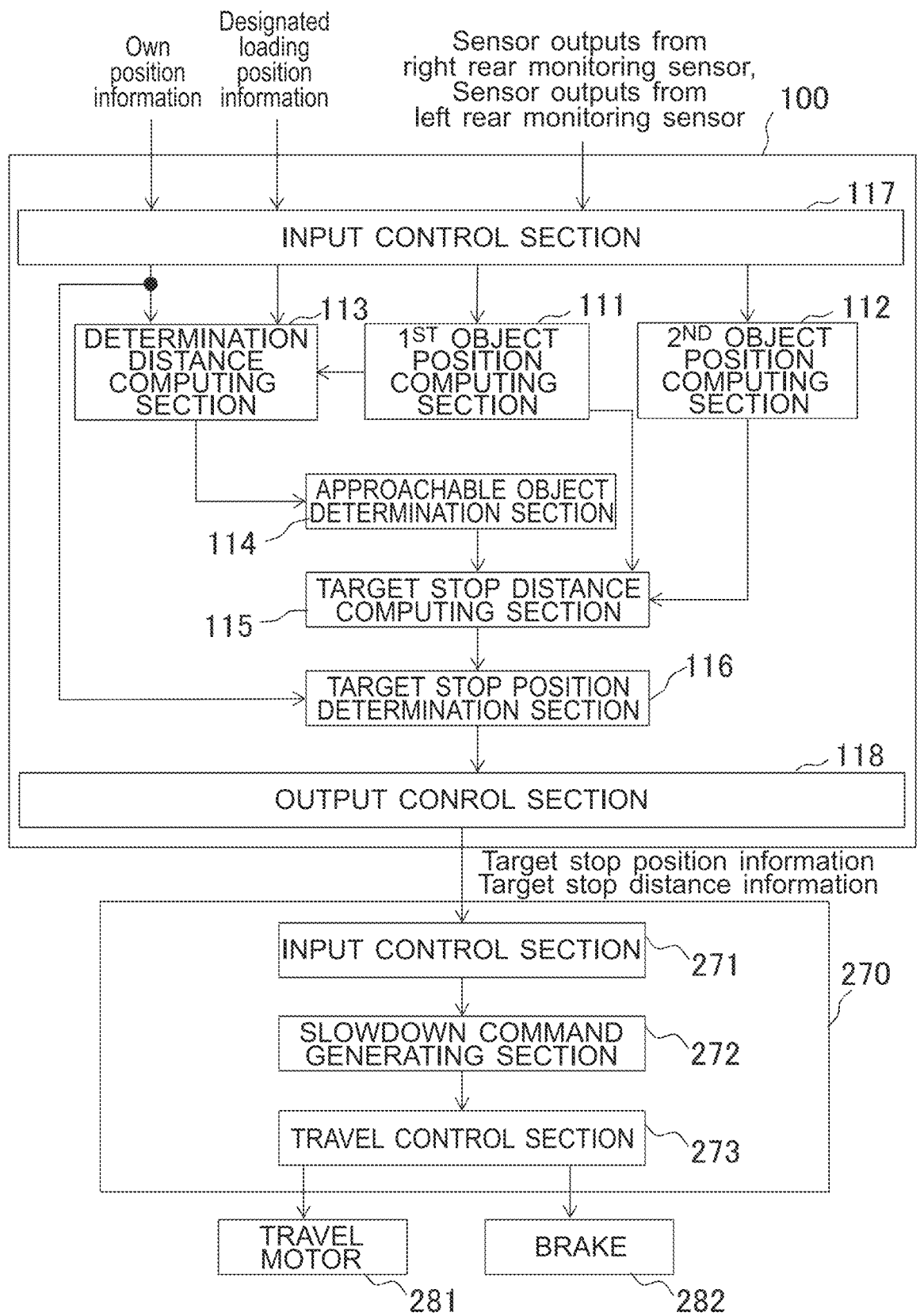
FIG. 13 is a functional block diagram of other examples of the reversing assistance device and external devices mounted on the manned dump truck.

As an example of the external device that outputs the target stop position from the reversing assistance device 100, a slowdown command generating section 270 of the dump truck 20 may be used as illustrated in FIG. 13. The slowdown command generating section 270 includes an input control section 271, a slowdown command generating unit 272, and a travel control section 273, the slowdown command generating unit 272 outputs a slowdown command to the travel control section 273 so that relying upon the target stop distance, the dump truck 20 stops at a position where the distance to the target stop position decreases to zero, and the travel control section 273 allows the dump truck 20 to stop at the target stop position while making the dump truck 20 slow down by controlling a travel motor 281 and brake 282. As a consequence, even if the utility vehicle 70 exists, the dump truck 20 is allowed to reverse toward the target stop position and to automatically stop at the target stop position while avoiding any interference with the utility vehicle 70, whereby operation errors by the operator can be suppressed.

Owing to the configurations described above, the distance to a rear object can be appropriately maintained by the output of a slowdown command in both the determination of a working face and the determination of an object other than the working face, so that the occurrence of unnecessary operative interventions can be suppressed.

The present invention is not limited to the above-described embodiment, and encompasses various embodiments and examples without departing from the spirit of the present invention.

LEGENDS

1: mining vehicle operation system, 10: hydraulic excavator, 18: reversing assistance device, 20: dump truck, 31: control server, 70: utility vehicle

The invention claimed is:

1. A dump truck comprising front wheels and rear wheels, a body frame mounted on the front wheels and rear wheels and a vessel mounted on the body frame, comprising:
 a first rear monitoring sensor that scans in a reverse direction of the dump truck as a scan direction, measures a first distance to a first object existing at a first height which is a height of a rear end portion of one of the rear wheels from a contact patch of the one rear wheel, and outputs first distance information indicating the first distance,
 a second rear monitoring sensor that scans in the reverse direction of the dump truck as a scan direction, measures a second distance to a second object existing at a second height which is higher than the first height and is a height of a rear end portion of the vessel, and outputs second distance information indicating the second distance,
 a GPS that acquires own position information of the dump truck, and
 a reversing assistance device configuring a travel assistance controller programmed to perform travel assistance when reversing toward a designated loading position,
 wherein the travel assistance controller is connected at an input interface thereof with the first rear monitoring sensor, the second rear monitoring sensor, and the GPS, respectively, and at an output interface thereof with an external device, and
 wherein the reversing assistance device comprises:
 a processor; and
 at least one memory;
 wherein the processor is configured to:
 receive, via a wireless communication network, designated loading position information indicating the designated loading position designated by a loading machine that loads a payload on the vessel of the dump truck,
 receive inputs of the first distance information, the second distance information, the own position information, and the designated loading position information,
 compute a position of the first object by using the own position information and the first distance information,
 compute a determination distance which is a distance between the position of the first object and the designated loading position,
 determine the first object to be an approachable object upon determining that the determination distance is equal to or smaller than an approachable object determination threshold preset to determine whether the first object is the approachable object,
 select, as a target stop distance, a smaller one of the first distance and the second distance upon determining that the first object is the approachable object, and compute, as the target stop distance, a distance by subtracting a predetermined distance, which has been set to avoid an interference to the first object, from the smaller one of the first distance and the second distance upon determining that the first object is not the approachable object,
 determine a target stop position based on the target stop distance and the own position information, and
 output target stop position information, which indicates the target stop position, to the external device.

2. The dump truck according to claim 1, wherein:
 the dump truck is a dump truck that performs autonomous travelling according to control instruction information to be received from a control server via the wireless communication network,
 the dump truck comprises a travel motor, a steering motor and a brake, all mounted thereon, and
 the external device is a travel controller programmed to allow the dump truck to autonomously travel according to the control instruction information, and the travel controller is connected at an input interface thereof with an output interface of the reversing assistance device and at an output interface thereof with the travel motor, the steering motor and the brake, respectively.

3. The dump truck according to claim 1, wherein:
 the dump truck comprises at least one of a monitor or an alarm, which is mounted on the dump truck, and
 the external device is an information providing controller, which is programmed to provide an operator, who is aboard the dump truck, with information based on the target stop position, and is connected at an input interface thereof with an output interface of the reversing assistance device and at an output interface thereof with the at least one of the monitor or the alarm.

4. A reversing assistance device comprising a travel assistance controller programmed to perform travel assistance when a dump truck, which comprises front wheels and rear wheels, a body frame mounted on the front wheels and rear wheels and a vessel mounted on the body frame, reverses toward a designated loading position designated by a loading machine that loads a payload on the vessel of the dump truck, the dump truck also comprising a first rear monitoring sensor that scans in a reverse direction of the dump truck as a scan direction, measures a first distance to a first object existing at a first height which is a height of a rear end portion of one of the rear wheels from a contact patch of the one rear wheel, and outputs first distance information indicating the first distance, a second rear monitoring sensor that scans in the reverse direction of the dump truck as a scan direction, measures a second distance to a second object existing at a second height which is higher than the first height and is a height of a rear end portion of the vessel, and outputs second distance information indicating the second distance, and a GPS that acquires own position information of the dump truck,
 wherein the travel assistance controller is connected at an input interface thereof with the first rear monitoring sensor, the second rear monitoring sensor, and the GPS, respectively, and at an output interface thereof with an external device,
 wherein the reversing assistance device comprises:
 a processor; and
 at least one memory;
 wherein the processor is configured to:
 receive, via a wireless communication network, designated loading position information indicating the designated loading position designated by a loading machine that loads a payload on the vessel of the dump truck, receive inputs of the first distance information, the second distance information, the own position information, and the designated loading position information, compute a position of the first object by using the own position information and first distance information, compute a determination distance which is a distance between the position of the first object and the designated loading position, determine the first object to be an approachable object upon determining that the determination distance is equal to or smaller than an approachable object determination threshold preset to determine whether the first object is the approachable object, select, as a target stop distance, a smaller one of the first distance and the second distance upon determining that the first object is the approachable object, and compute, as the target stop distance, a distance by subtracting a predetermined distance, which has been set to avoid an interference to the first object, from the smaller one of the first distance and the second distance upon determining that the first object is not the approachable object, determine a target stop position based on the target stop distance and the own position information, and output target stop position information, which indicates the target stop position, to the external device.

* * * * *